March 22, 1949.  E. WILDHABER  2,464,915
METHOD OF PRODUCING FACE CLUTCHES
Original Filed Sept. 1, 1942  5 Sheets-Sheet 1

Inventor
ERNEST WILDHABER
By
Attorney

March 22, 1949.　　　　E. WILDHABER　　　　2,464,915
METHOD OF PRODUCING FACE CLUTCHES
Original Filed Sept. 1, 1942　　　　　　　5 Sheets-Sheet 2
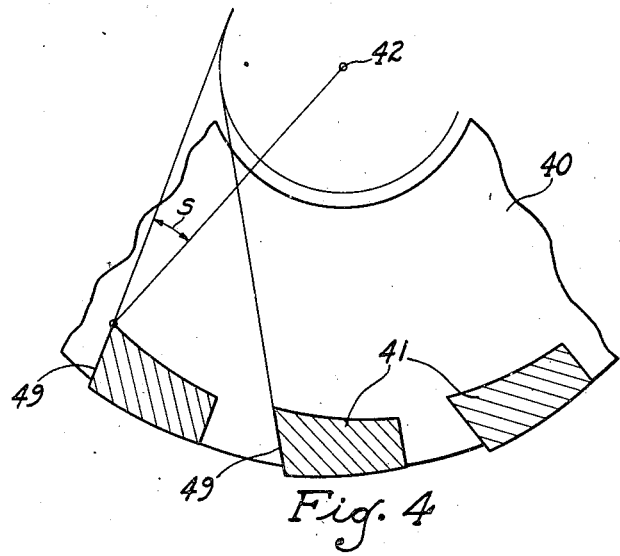
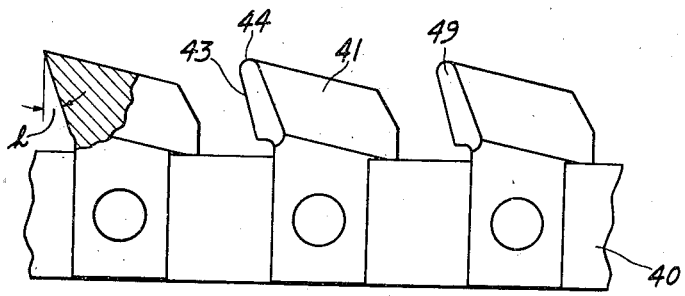
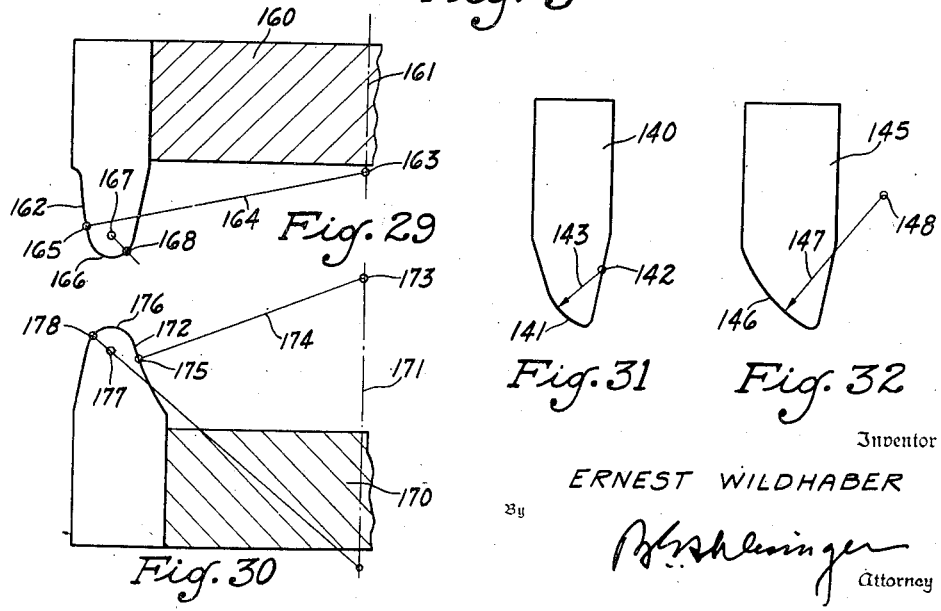
Inventor
ERNEST WILDHABER
By
　　　　Attorney March 22, 1949.  E. WILDHABER  2,464,915
METHOD OF PRODUCING FACE CLUTCHES
Original Filed Sept. 1, 1942  5 Sheets-Sheet 3
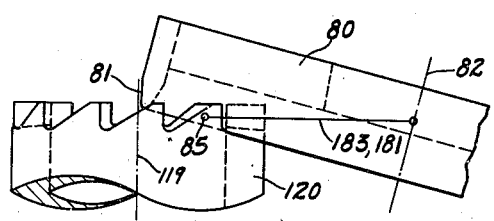
Fig. 17
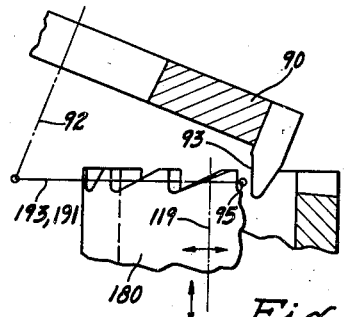
Fig. 19
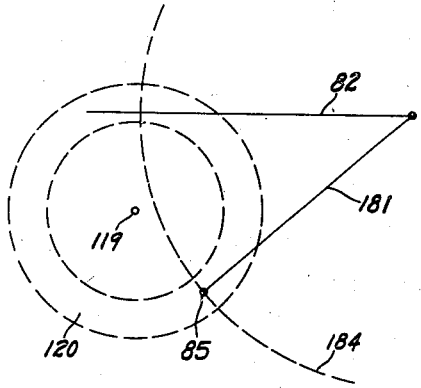
Fig. 18
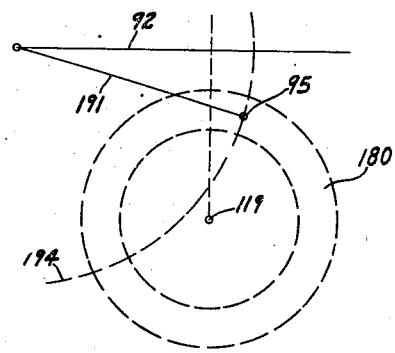
Fig. 20
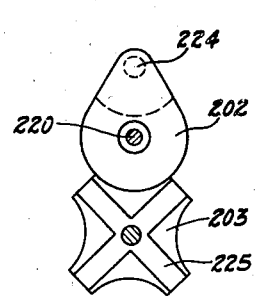
Fig. 22
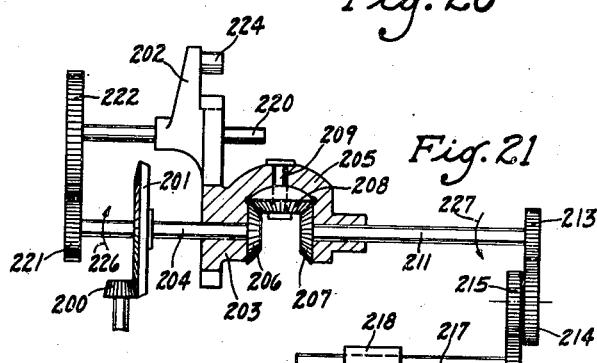
Fig. 21
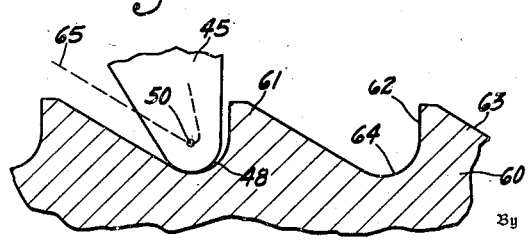
Fig. 7
Inventor
ERNEST WILDHABER
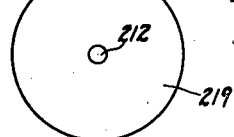
Attorney March 22, 1949. E. WILDHABER 2,464,915
METHOD OF PRODUCING FACE CLUTCHES
Original Filed Sept. 1, 1942 5 Sheets-Sheet 4

Inventor
ERNEST WILDHABER
By B.F. Schlesinger
Attorney

March 22, 1949.　　　　E. WILDHABER　　　　2,464,915
METHOD OF PRODUCING FACE CLUTCHES
Original Filed Sept. 1, 1942　　　　　　　　5 Sheets-Sheet 5

Inventor
ERNEST WILDHABER
By
Attorney

Patented Mar. 22, 1949

2,464,915

UNITED STATES PATENT OFFICE 2,464,915

METHOD OF PRODUCING FACE CLUTCHES

Ernest Wildhaber, Brighton, N. Y., assignor to Gleason Works, Rochester, N. Y., a corporation of New York Original application September 1, 1942, Serial No. 456,894, now Patent No. 2,398,570, dated April 16, 1946. Divided and this application September 11, 1945, Serial No. 615,581

17 Claims. (Cl. 90—9.4)

The present invention relates to methods of making clutches and particularly to methods of producing toothed face clutches which have helicoidal side tooth surfaces and which are adapted either to run in one direction only or to be disengaged automatically under excessive loads. This application is a division of my copending application Serial No. 456,894, filed September 1, 1942, now Patent No. 2,398,570, granted April 16, 1946.

A primary object of the invention is to provide a very fast method for cutting or grinding toothed face clutch members having helicoidal side tooth surfaces.

Another object of the invention is to provide a method for cutting or grinding toothed face clutches of the character described in which opposite sides of a tooth space may be cut in a single operation.

A further object of the invention is to provide a method for cutting toothed face clutches of the character described with which full control of the length of bearing or tooth contact on both sides of the teeth of mating clutch members may be had.

A further object of the invention is to provide a method for cutting or grinding toothed face clutch members of the character described and possessing the above recited advantages which may be practiced on a standard gear cutting machine with but slight modification of the same.

Other objects of the invention will be apparent hereinafter from the specification and from the recital of the appended claims.

The present invention may be applied to the manufacture of saw-tooth clutches as well as to the manufacture of clutches having opposite side tooth profiles that are symmetrically inclined to the clutch axis. In a clutch of the first-named type made according to the present invention, the teeth have helicoidal surfaces at one side only; the opposite sides of the teeth are surfaces of revolution. In a clutch of the second-named type made according to the present invention, both sides of the teeth have helicoidal surfaces.

In cutting or grinding the teeth of either type of clutch, a face mill cutter or an annular grinding wheel is preferably employed, and tooth surfaces are cut that are longitudinally curved, one side of a tooth space being longitudinally convex and the other side longitudinally concave. Moreover, in cutting or grinding either type of clutch, the two sides of a tooth space are preferably cut or ground in a single operation.

For cutting the helicoidal side of a tooth space of either type of clutch, the tool is rotated in engagement with the clutch blank while a simultaneous relative movement is produced between the tool and blank about and in the direction of the blank axis. In a saw tooth type of clutch, the helicoidal side of a tooth space may be cut first by feeding the tool into the blank while producing the described helical movement between tool and blank about the blank axis. Then the tool may be allowed to dwell at full depth position long enough to finish the opposite side of the tooth space as a surface of revolution. Then the tool is withdrawn from engagement with the blank, and the blank indexed to bring another tooth space into position for cutting. The tooth spaces of a saw tooth clutch may also be finished by first feeding the tool into depth in the direction of the clutch axis to finish one side of a tooth space as a surface of revolution, and then slowly withdrawing the cutter or wheel outwardly while moving the work about and in the direction of its axis to produce a helicoidal tooth surface on the opposite side of the tooth space. In a clutch member having helicoidal surfaces on both sides of its teeth, one side of a tooth space is finished while the tool is being fed into depth, the opposite side while the tool is being withdrawn from depth. The work rotates continuously in the same direction and at a uniform velocity during both in and out feed. When the tooth space has been cut, the blank is indexed.

In both types of clutches, the tooth spaces are preferably cut to taper in depth from their outer to their inner ends. Only the tooth space bottoms need be tapered, however; the tops of the teeth may lie in a plane perpendicular to the clutch axis.

Because of the axial feed, the helicoidal sides of the teeth are cut by the tips of the cutter blades. Since the non-helicoidal sides of the teeth of a saw-tooth clutch are cut with side-cutting edges which lie at one side only of the cutter, a cutter may be used for cutting a saw-tooth clutch member according to this invention which has all of its blades sharpened to cut on side of a tooth slot only. This makes a very efficient tool and speeds up the cutting operation.

The non-helicoidal sides of the teeth may be cylindrical surfaces and be cut with a cutter or grinding wheel having straight side-cutting edges parallel to its axis. Preferably, however, such a clutch member is cut with a tool whose cutting edges are inclined to the tool axis. The cutter or wheel is then tilted so that its cutting edges will extend in the direction of the clutch axis. The non-helicoidal sides of the clutch member may also be cut with a cutter having curved side-cutting edges so that the non-helicoidal sides of its teeth will have side surfaces that are spherical or other curved surfaces of revolution.

Where both sides of the clutch teeth are helicoidal, cutting of both sides is done by the tip-cutting edges of the cutter, one side being cut during the in-feed, the other side during the out-feed.

Lengthwise mismatch of the non-helicoidal sides of the teeth of engaging clutch members may be obtained by using different diameter cutters to cut the mating tooth surfaces of the pair. Lengthwise mismatch of the mating helicoidal tooth sides depends on the difference in the radii of the cutters, the tooth taper, and the radii of the tip cutting edges of the cutters as will be explained more fully hereinafter.

The invention may readily be practiced on a machine of conventional type for generating spiral bevel or hypoid gears with but slight modification of such a machine. In such a machine, means is already provided to rotate the work in time with depthwise feed thereof, and depthwise feed is effected by movement of a sliding base on which the work head is adjustably mounted. To use the machine for the purposes of the present invention, the work head may be set at zero so that the work axis will extend in the direction of the feed movement of the sliding base. Thus as the work rotates on its axis and is fed axially, the desired helicoidal movement between cutter and work will be obtained. It requires but a very slight modification in the work drive of the machine to obtain the slow rotation, stoppage and reversal of the work that is desirable in order to cut efficiently the helicoidal sides of the teeth.

Several different embodiments of the invention are illustrated in the accompanying drawings, in which:

Figs. 4 and 5 are a fragmentary sectional view in a plane perpendicular to the cutter axis and a fragmentary elevational view, respectively, of a face mill cutter for cutting one member of a clutch according to this invention;

Fig. 7 is a view similar to Fig. 6, but showing a clutch member made according to a slight modification of the invention and illustrating diagrammatically the method of cutting the same;

Figs. 17 and 18 illustrate diagrammatically a preferred way of cutting or grinding one member of a saw-tooth clutch pair according to this invention;

Figs. 19 and 20 are corresponding views illustrating diagrammatically the preferred way of cutting or grinding the other member of the clutch pair;

Fig. 21 is a diagrammatic view showing how the gear train employed in a standard gear cutting machine for rotating the work spindle may be modified in order to practice the present invention on that machine;

Fig. 22 is a view showing a detail of the mechanism illustrated in Fig. 21;

Figs. 29 and 30 are fragmentary axial sectional views, showing a pair of cutters for cutting the mating members of a further modified form of clutch made according to this invention; and Figs. 31 and 32 are views showing blades of two different modified forms of cutters.

Figure 1:
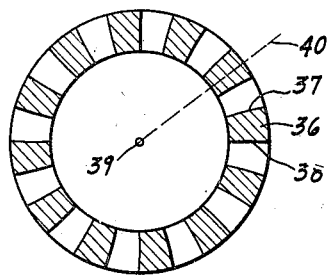
Fig. 1 is a sectional view of a face clutch member made according to one embodiment of this invention, the section being taken in a mean plane, hereinafter referred to as the pitch plane, which is perpendicular to the clutch axis and in which the thickness of the teeth of the clutch member at any point in the length of the teeth equals the width of its tooth spaces.
Figure 3:
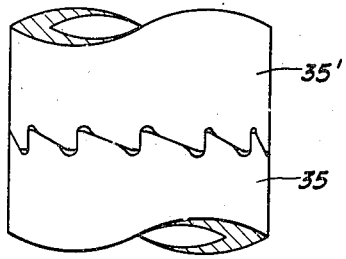
Fig. 3 is an elevational view showing this member in engagement with its mate, the two members constituting a saw tooth clutch made according to one embodiment of this invention.
Figure 2:
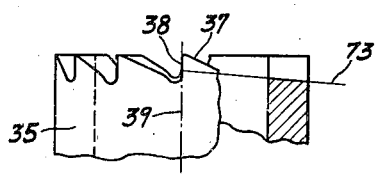
Fig. 2 is a part elevational, part axial sectional view of this clutch member.

In the drawings, 35 and 35' (Fig. 3) denote, respectively, the two members of a saw tooth clutch constructed according to one embodiment of this invention. Each member has teeth 36 whose side surfaces 37 and 38 are longitudinally curved.

In the illustrated embodiment of the invention, the sides 38 of the teeth have straight profiles extending substantially parallel to the clutch axis 39 while the opposite sides 37 of the teeth are helicoidal surfaces of constant lead. The tooth sides 38 are portions of surfaces of revolution and are preferably counterparts of the side-cutting surface of the cutter used to produce the clutch member. These surfaces 38 may be cylindrical surfaces, or conical surfaces or even surfaces of curved axial profile such as spherical surfaces.

The two members of the clutch pair have, respectively, of course, teeth of opposite hand. The sides 37 of the teeth of the member 35 are, for instance, longitudinally convex while the opposite sides 38 are longitudinally concave. The mating sides of the other member 35' are longitudinally concave and longitudinally convex, respectively. In the illustrated embodiment of the invention the teeth of both members extend substantially radially of the clutch axis 39, that is, the median line 40 of a tooth is radial of the clutch axis 39.

For cutting the teeth of the clutch members 35 and 35' face mill cutters may be employed. A cutter of this type is shown in Figs. 4 and 5. It has a rotary head 40 and a plurality of cutting blades 41 which are arranged circularly about the axis 42 of the head and which have their cutting portions projecting beyond one side face of the head in the general direction of the axis of the head. With such cutters it is possible not only to cut the clutch members efficiently and at high speed but also to obtain a clutch in which the contacting tooth surfaces of the mating members have a desirable localization of lengthwise tooth contact.

Figure 6:
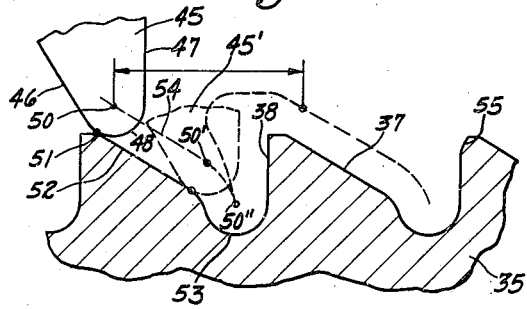
Fig. 6 is a mean circular section of one of the clutch members taken concentric with the clutch axis and on an enlarged scale, and illustrating diagrammatically one of the ways of cutting this clutch member.

Fig. 6 illustrates diagrammatically the cutting of the tooth surfaces of one clutch member, here the clutch member 35. The face-mill cutter employed in the cutting of the tooth surfaces 37 and 38 of this member has cutting blades 45 whose opposite side edges 46 and 47 are of straight profile and whose tip cutting edges 48 are rounded and preferably of circular shape. One blade 45 of the cutter is shown in full lines near the start of the cut when contact between the rounded tip cutting edges 48 of the cutter and the helicoidal side tooth surface 37, which is to be produced, is at 51. As the cutter rotates in engagement with the clutch blank to cut a tooth space of the blank, a relative feed movement is effected between cutter and blank about the clutch axis and in the direction of the clutch axis. In the instance illustrated, the feed movement during cutting of the functioning part of a helicoidal side tooth surface consists of uniform rotation about the clutch axis, which is preferably performed by the work, and of uniform feed along the clutch axis, also preferably performed by the work.

The dash line 54 denotes the path of travel of the center 50 of the rounded portion 48 of the cutter blades during the cutting operation. While the center is traveling from position 50 to position 50', the functioning portion of the side surface 37 is cut. In this part of the operation the tool follows a mean helix 52 in the desired side tooth surface and generates the desired helicoidal surface on the work. Throughout this movement, the finishing cut along the whole of the helicoidal surface from top to bottom thereof is made by the same point 51 in the cutter profile.

After the tool has reached the position shown in dotted lines 45', the work rotation is slowed down, whereas the uniform axial feed motion may continue with the result that near the root the profile of the tooth side 37 is curved downwardly, as shown. A well rounded root portion 53 is thereby produced in the bottom of the tooth space. This makes for increased strength. As the cutter approaches full depth position, the axial feed is also slowed down and, when the cutter reaches full depth position, the work stands still for a moment. It is during this part of the cycle that the tooth side 38 is finished and its shape is thus a complement of the shape of the side 47 of the cutting tool. 50'' denotes the position of the center of the tip portion of the cutter when the cutter is cutting at full depth.

After the tool has attained full depth position, the axial feed is reversed and at the same time the work rotation is also reversed. This causes the tool to move slightly away from the finished tooth side 38 so as to clear the same during its withdrawal movement. The axial feed in the reverse direction is performed at an increased rate and amounts to a rapid withdrawal after the completed cutting of a tooth space.

When the tool has cleared the blank, the blank is indexed. Then the cycle starts anew on the next tooth space with the tool being again fed depthwise and the work again rotating in the forward direction.

The cycle can, of course, also be performed in the opposite direction so that the tool is fed relatively into the blank slowly to first cut the side 38 and then, after full depth position has been reached and that side completed, the tool is fed slowly outwardly in the direction of the blank axis while the blank is rotated on its axis so that the tool will follow the desired helical path and produce the helicoidal side 37 of the tooth space. In either case, the rotation about the work axis is slowed down periodically to a moment of stand-still and preferably reversed for a short time.

To avoid completely any possibility of interference between the tip of a tooth of one clutch member and the rounded bottom of the tooth space of the mating clutch member, the teeth of the clutch members may be slightly chamfered at their tips. The tooth at the extreme right of Fig. 6 is shown so chamfered as indicated at 55. This chamfer may be applied by hand. Chamfering can be completely avoided, however, by making the tip portion 48 of the cutting blades more rounded.

The shapes of the clutch teeth may otherwise be varied within considerable limits. Thus a further embodiment of the invention is illustrated in Fig. 7. Here a clutch member 60 is shown whose teeth 61 have sides 62 of straight profile which are surfaces of revolution and opposite sides 63 which are helicoidal surfaces but so formed as to blend in with the rounded bottoms 64 of the tooth spaces. This tooth shape may be produced with a face mill cutter having cutting blades 45, as already described, by rotating the cutter in engagement with the clutch blank while effecting a relative movement between the cutter and blank about and in the direction of the work axis as before, the in-feed and the work rotation being simply slowed down at the same moment and in a constant proportion to each other. The cutter blade 45 is shown in a position of full depth. 65 denotes the path of the center 50 of curvature of the rounded tip portion 43 of the tool during the cutting of the tooth space. The side 62 of the tooth space is cut, as in the previously described embodiment, during a slight dwell of the tool at full depth position while the work is stationary.

As will be apparent, the width of the tooth spaces, or of the teeth, or both, must decrease from the outer to the inner ends thereof. In order to produce the desired taper in width of the tooth spaces where both sides of a tooth space are produced in a single operation as is preferred, the tooth spaces are cut to taper in depth from their outer to their inner ends. The cutting path, that is, the path of the plane of the tip cutting edges of the cutter, is therefore inclined to a plane perpendicular to the clutch axis.

Figure 8:
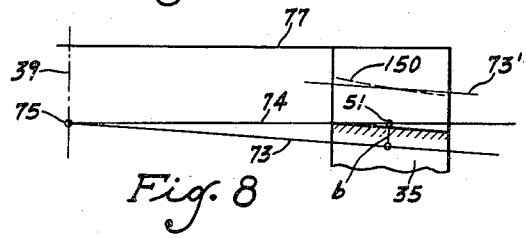
Fig. 8 is an enlarged fragmentary axial sectional view of the clutch member, showing the taper of its teeth and illustrating diagrammatically certain relationships between the cutter employed and the clutch member.
Figure 9:
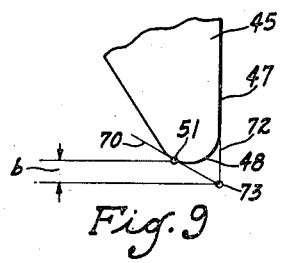
Fig. 9 is a diagrammatic view showing a blade of a cutter such as may be employed in cutting the clutch members of Figs. 1 to 3 inclusive, and further illustrating diagrammatically the relationship between the cutter and the work required for cutting two sides of a tooth space of the clutch member simultaneously according to this invention.

To obtain the desired taper, the cutting path must be so tipped that the line of intersection of the planes, which are tangent to the cutting edges that cut the opposite sides of a tooth space, will intersect the clutch axis 39. 70 (Fig. 9) denotes a plane tangent to the rounded tip cutting edge 48 of the cutter at the point 51 in this cutting edge which finish cuts the central portion of the helicoidal sides of the clutch teeth. 72 denotes a plane tangent to the side cutting edge 47 of the cutter which cuts the opposite sides of the teeth. These two planes intersect in a line 73, which appears as a point in Fig. 9. The cutting plane of the tip of the cutter should be so tilted with reference to a plane 74 perpendicular to the clutch axis 39 and passing through point 51 that this line 73 will intersect the clutch axis in the same point 75 (Fig. 8) as said plane 74. In mathematical terms, with distance A equal to 51—75, which is the mean radius of the clutch, and $b$ equal to the axial distance between points 51 and 73, then the inclination $i$ of the cutting path to a plane perpendicular to the clutch axis can be determined from the equation:

$$\sin i = \frac{b}{A}$$

for teeth extending in a generally radial direction, as illustrated.

This formula and cutting method apply broadly also to tools other than face mill cutters as, for instance, single reciprocatory tools, broaches, etc. Ordinarily only the tooth space bottoms are tapered. The tops of the teeth may remain in a plane perpendicular to the clutch axis as shown at 77 in Fig. 8.

It is possible to use face mill cutters whose straight side cutting edges 47 lie in a cylindrical surface concentric with the cutter axis. Preferably, however, cutters are used which have conical cutting surfaces or broadly, cutting surfaces which have positive inclination to the cutter axis. In such cutters, the outside cutting edges have their smallest distance from the cutter axis at the tops of the blades and the inside cutting edges have their largest distance from the cutter axis at the tops of the blades. Such cutters are easier to relieve and, moreover, the blades do not require radial adjustment after sharpening. From the standpoint of grinding, grinding wheels whose active side surfaces are of positive inclination are still more important on account of wheel life.

Not all portions of the cutting profiles of a cutter are needed for cutting a particular member of the clutch pair as will be understood from Figs. 6 and 7. Opposite sides of the tooth spaces of one member of the clutch may be cut, respectively, with the tip-cutting edges of the cutter and with the side-cutting edges at one side of the cutter. Opposite sides of the tooth spaces of the other member of the clutch may be cut, respectively, with the tip-cutting edges and with the side-cutting edges at the opposite side of the cutter. Hence, if the whole cutting profile is embodied by sharp cutting edges, that is, if the cutter is provided with both inside and outside cutting blades, then the same cutter may be used for cutting both members of the clutch pair. It is preferable, however, to provide the cutter for cutting one clutch member with outside cutting blades only and the cutter for cutting the other clutch member with inside cutting blades only. In this way, the blades can be sharpened with the side and front rakes to obtain the keenest cutting edges on the parts of the profiles which are in operation during cutting of a particular member of the clutch pair.

The cutter 40 shown in Figs. 4 and 5 is of this character. Its blades 41 are all alike. All are inside cutting blades and contain keen inside cutting edges 43 and top cutting edges 44. These cutting edges are formed by sharpening the blades 41 so that the front faces 49 of the blades are positioned to give combined side rake (angle $s$, Fig. 4) and front rake (angle $h$, Fig. 5). Thus a very efficient cutter is obtained at the expense only of having somewhat blunt outside edges on the blades, but these edges do no cutting anyhow.

As has already been stated, it is desirable to have lengthwise mismatch between the contacting tooth surfaces of the mating clutch members so as to have localization of tooth bearing.

Figure 10:
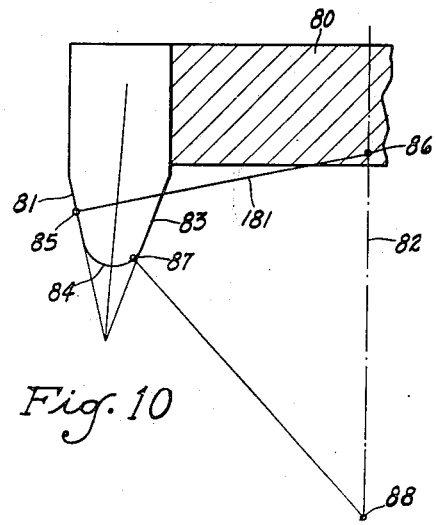
Figs. 10 and 11 are diagrammatic views showing the relative constructions of a pair of cutters such as may be employed according to this invention for producing mating clutch members which will engage with less than full length tooth contact.
Figure 11:
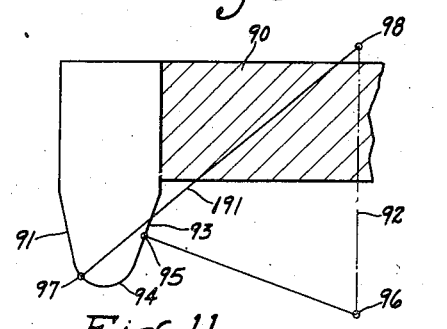

Figs. 10 and 11 show diagrammatically a pair of cutters for producing a pair of mating clutch members according to this invention whose contacting tooth surfaces will engage with less than full length tooth contact. The cutter 80 (Fig. 10) for cutting one clutch member has a straight outside profile 81 positively inclined to the cutter axis 82, a straight inside profile 83 also positively inclined to the cutter axis 82, and a substantially circular tip-cutting profile 84 which joins the two straight side profiles. The inside profile 83 is more inclined to the cutter axis 82 than is the outside profile 81. The cutter 90 (Fig. 11) for cutting the other clutch member has an outside cutting profile 91 positively inclined to the axis 92 of the cutter, an inside cutting profile 93 also positively inclined to the axis 92 but more inclined than the profile 91, and a curved tip cutting profile 94 joining the profiles 91 and 93. For most efficient cutting action, the blades of the cutter 80, which cuts one member of the pair, may be sharpened to cut only with the portions 81 and 84 of their profiles while the blades of the cutter 90, which cuts the other member of the pair, may be sharpened to cut only with the portions 93 and 94 of their profiles.

Lengthwise mismatch of the contacting straight profiled sides of the teeth of mating clutch members is obtained by using a cutter 80 for cutting one clutch member having a normal radius 85—86 for its outside cutting surface at mean point 85 which is larger than the normal radius 95—96 of the inside cutting profile of the other cutter 90 at mean point 95.

Lengthwise mismatch of the contacting helicoidal side surfaces of the mating clutch members depends on the relative length of the normal radii 87—88 (Fig. 10) and 97—98 (Fig. 11) of the tip cutting edges of the two cutters, where points 87 and 97 are, respectively, the points which finish the contacting mean portions of said helicoidal surfaces, and on two other factors. These two other factors are the inclinations $i$ of the cutting directions, which ordinarily have small effect, and the radii of the curved tip cutting portions 84 and 94 of the cutters.

The last named factor will now be considered further. 100 and 110 (Fig. 12) denote two face mill cutters which are adapted to cut, respectively, the two meshing members of a face clutch constructed according to this invention. The axes of these two cutters are at 102 and 112, respectively. The cutter 100 has outside cutting edges 103 and rounded tip cutting edges 104. The cutter 110 has inside cutting edges 111 and rounded tip cutting edges 114. The center of the rounded tip cutting portion 104 of a blade of the cutter 100 is at 105 and the center of the rounded tip cutting portion 114 of a blade of the cutter 110 is at 115. In the position shown in Fig. 12, the two cutters are shown with the rounded cutting surfaces of two of their blades in contact with one another at the points 107 and 117, respectively. These two points are the points in the rounded tip surfaces of the blades, which finish, respectively, the mean portions of the helicoidal contacting sides of the engaging clutch members.

Figures 12, 13, 15, 16:
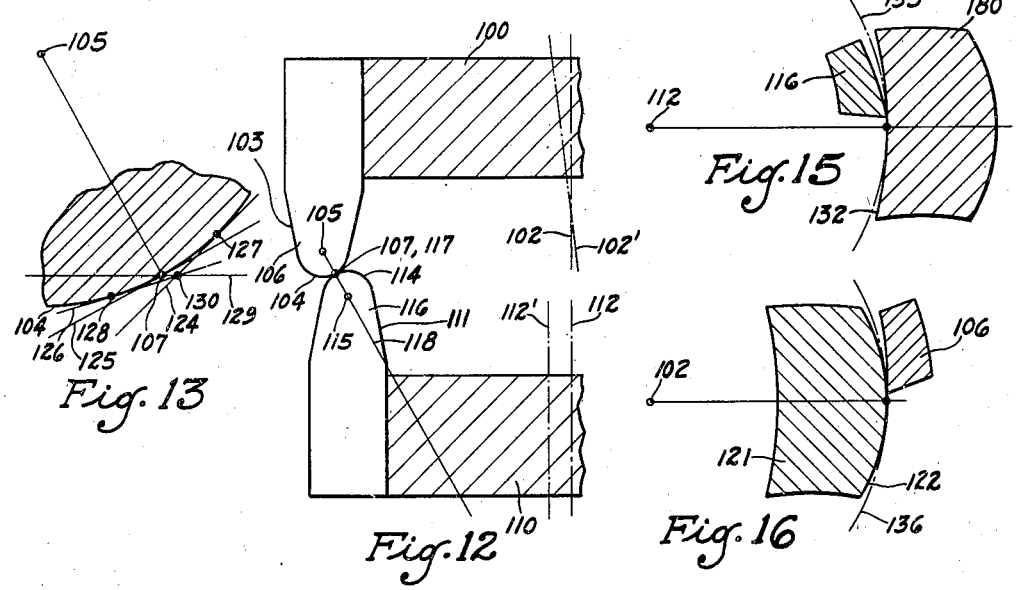
Fig. 12 is a diagrammatic view further illustrating how the relative radii of the tip cutting edges of a pair of cutters, such as may be employed for cutting the two members of a clutch according to this invention, will affect the lengthwise tooth bearing on the mating helicoidal sides of the clutch.
Fig. 13 is an enlarged fragmentary axial sectional view of one of these cutters taken adjacent the tip surface of the cutter, and further illustrating the relationship between the cutter and the work.
Figs. 15 and 16 are diagrammatic views taken in the planes perpendicular to the clutch axis, showing the cutting of mating helicoidal tooth surfaces of the two clutch members and how these tooth surfaces will have a lengthwise mismatch or localized tooth bearing.

In the instance illustrated in Fig. 12, the normal radii 118 of the two cutters at common point 107, 117 are equal. Despite this, however, lengthwise mismatch will be obtained between the contacting helicoidal tooth surfaces of the engaging clutch members whene in mesh. This will now be demonstrated.

Figure 14:
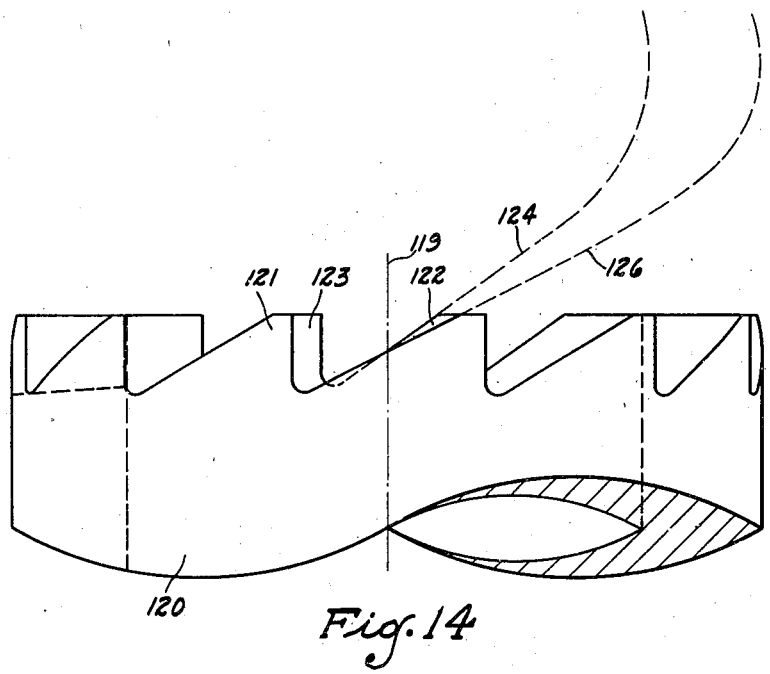
Fig. 14 is an enlarged elevational view of one of the clutch members, illustrating diagrammatically the nature of the helicoidal side surfaces of its teeth.

As will be apparent from Fig. 14, in any clutch member 120 whose teeth 121 have helicoidal side tooth surfaces 122 of generally radial profile, the helicoidal side surfaces of the teeth contain helices whose inclination to the clutch axis 119 varies from one end of the tooth surface to the other. This is because the lead angles of the helices vary with the radial distance from the clutch axis. Thus, as shown in Fig. 14, the helices 124 and 126 at opposite ends of a helicoidal tooth surface 122 of the clutch member are inclined to one another and have different inclinations to the clutch axis. As will be noted, these helices appear as substantially straight lines in the zone of the tooth surface itself.

Let us assume for the moment that, instead of having a clutch member whose teeth have longitudinally curved side surfaces cut by a tool having cutting edges traveling in a longitudinally curved path about a fixed axis, we have a clutch member whose teeth have no lengthwise curvature but are straight and cut, therefore, by a cutting tool moving in a rectilinear path. In such a case, the tip cutting surface of the tool would be a cylindrical surface perpendicular to the drawing plane of Fig. 12 and having a profile 104 or 114 centered at 105 or 115, respectively.

Fig. 13 is a fragmentary axial sectional view through a blade of the cutter 100 on an enlarged scale and may be considered also as a fragmentary view of the cylindrical surface which would be present if the tool were a rectilinearly reciprocating tool. In cutting a helicoidal side surface of a straight toothed clutch member with such a cylindrical cutting surface, the points of contact between the cutting surface of the tool and the helicoidal tooth side will change as the tool moves along the tooth surface from one end thereof to the other. Thus the cutting surface 104 of the tool will contact with the helix 124 at the inner end of the tooth surface in point 127 while the cutting surface 104 will contact with the helix 125 lying at a mean point in the length of the tooth surface in point 107 and the cutting surface 104 will contact with the helix 126 lying at the outer end of the tooth surface in a point 128.

The helix 124 at the inner end of the tooth surface will intersect a plane 129 perpendicular to the axis 102 of the cutter and containing the point 107 in a point 130 which lies at the right of the point 107 and whose distance from the point 107 increases with increasing distance of the helix 124 from the mean helix 125. Likewise the helix 126 at the extreme radial distance from the axis 119 of the clutch will intersect the plane 129 in a point to the right of point 107. It will be seen, therefore, that there is a difference between the lengthwise sectional profile of the cutting surface 104 and the lengthwise sectional profile of the helicoidal tooth surface produced thereby. It will further be seen that this departure is independent of the lengthwise shape of the cutting surface for all practical purposes. That is, at any given radial distance from the clutch axis either side of a mean point in the tooth length, the separation of the lengthwise cutting profile and of the lengthwise tooth profile is the same for a tool moving in a straight path as it is for a tool moving in a longitudinally curved path.

Fig. 16 is a sectional view in a plane corresponding to the plane 129 of Fig. 13, showing the cutting of a helicoidal side tooth surface 122 of clutch member 120. 106 denotes one of the blades of the cutter and 136 is the path taken by a point in the tip cutting edge of the blade as the cutter rotates about its axis 102. The convex surface cut on the helicoidal tooth side 122 is seen to be more curved than the concave cutting surface 136 traced by the tip cutting edge of the cutter 100.

Fig. 15 is a section similar to that of Fig. 16, showing the cutting of a helicoidal surface 132 of the clutch member 180 which is to engage with the clutch member 120. Points 117 in the tip cutting edges of the blades 116 of the cutter 110 will trace a path 135 as those blades revolve about the axis 112 of the cutter, which will be more curved than the concave helicoidal side surface 132 produced by those blades. It will be seen, therefore, that although the tip cutting surfaces 104 and 114 of the two cutters 100 and 110 have the same normal radii 118, the two helicoidal surfaces 122 and 132 produced, respectively, by these cutting surfaces will not match each other along their whole length but will contact with a localized tooth bearing as is desired.

Figs. 15 and 16 show the curvature of the surfaces much exaggerated and this curvature is usually quite slight and is hardly to be noticed in a view such as Fig. 14.

It is seen from the foregoing that the produced mismatch increases with increasing profile radius of the tip cutting edge of the cutters and also with increasing length of face of the clutch teeth. It is reduced with increasing inclination $i$ of the cutting plane to a plane perpendicular to the clutch axis, and it can be controlled readily by the cutter design. For instance, to reduce the length of tooth bearing on the straight profiled side 123 (Fig. 14) of a clutch tooth 121 and increase the length of tooth bearing on the helicoidal side 122, change the relative diameters of the cutters employed for cutting the two members of the clutch, namely, reduce the diameter of the cutter 110 as compared with the diameter of the cutter 100. This aim would be attained if the cutter 110 had its axis in position 112' (Fig. 12) instead of at 112. To increase the length of tooth bearing on both sides 122 and 123 of the clutch teeth, increase the inclination of the inside cutting edges 111 of the cutter 110 or decrease the inclination of the outside cutting edges 103 of the cutter 100. A decrease of the outside blade angle of the cutter 100 would result if the axis of this cutter were, for instance, at 102' (Fig. 12) instead of at 102.

Complete control of the amount of lengthwise tooth contact between the two members of a clutch can, therefore, be obtained by combining control of the normal radii of the two cutters with control of inclination of the direction of the cutting path and control of the radii of the tip cutting surfaces. The cutter specifications may be computed mathematically to give a desired amount of localization of bearing on both sides of the clutch teeth or they may be arrived at experimentally. Cutter diameter changes, in particular, are very easily made in practice.

Figs. 17 and 18 further illustrate the preferred way of cutting or grinding the clutch member 120 whereas Figs. 19 and 20 illustrate the preferred way of producing the clutch member 180 which engages therewith.

The cutters 80 and 90 respectively (Figs. 10 and 11), may be used for cutting these two clutch members. The cutter 80 has, as already described, outside cutting edges 81 of positive inclination to the cutter axis 82 and the cutter 90 inside cutting edges 93 also of positive inclination to its axis 92. The cutters are shown in positions of full depth engagement with the clutch members 120 and 180, respectively, and they are so tilted that the surface normals 181 and 191, respectively, at mean points 85 and 95, respectively, lie in planes 183 and 193, respectively, perpendicular to the clutch axis 119. The cutter 80, which cuts with its outside cutting edges 81, is tilted into the work but it clears the clutch tooth zone opposite to that where it is cutting, because of the tapering depth of the teeth and tooth spaces. It is often necessary, however, to observe a relationship between the tooth number and the cutter diameter so that the cutter may dip into a tooth space in the tooth zone opposite where it is cutting without touching the final finished sides of the tooth space. In the plan view of Fig. 18, the cutter axis 82 appears offset from the clutch axis 119 on the side opposite the point 85 where the cutter is cutting. 184 denotes the path of a mean point in the cutting surface during a revolution of the cutter.

Cutter 90, which cuts with its inside cutting edges 91, is tilted away from the work 180. In the plan view of Fig. 20, the cutter axis 92 appears to be offset from the clutch axis 119 on the same side as the mean contact point 95. 194 denotes the path of a mean point in the cutting surface during a revolution of the cutter.

As the cutter rotates on its axis in the cutting of either clutch member 120 or 180, the work is rotated on its axis 119 and is moved lengthwise of its axis to cut the helicoidal sides of the teeth, while the non-helicoidal sides are cut with the cutter at full depth position, as previously described.

As already stated, saw-tooth clutch members constructed according to this invention may be cut on standard spiral bevel gear cutting machines with slight modification of such machines. Feed in the direction of the work axis is obtained on such machines by setting the work so that its axis extends in the direction of the feed movement of the sliding base on which the work head is mounted in such a machine. The required rotary motion of the work, which comprises uniform rotation, stoppage, and reversal all during the cut, can be secured by various means, one embodiment of which is illustrated in Figs. 21 and 22.

This work rotating means is so constructed as to drive the work at a uniform velocity during part of each cutting cycle and to impart periodically to the work an added rotary motion at a varying velocity to effect stoppage, reversal of the work, and indexing. The uniform motion is produced by bevel gears 200 and 201 which are driven from any suitable source of power. The non-uniform motion is a Geneva motion in the illustrated instance produced by the actuating member 202 and the Geneva wheel 203.

The gear 201 is secured to a shaft 204 to which is also secured a bevel gear 206 that forms one of a set of differential gears comprising the bevel side gears 206 and 207 and the planetary bevel gear 208. The last named gear is secured to a stud 209 which is rotatably mounted in the differential housing 205. The side gear 207 is secured to a shaft 211 which is aligned with the shaft 204, and the housing 205 itself is journaled concentric with the aligned shafts 204 and 211. The shaft 211 is geared to the work spindle 212 by the change gears 213, 214, 215 and 216, the shaft 217, the worm 218 and the worm-wheel 219. The latter is secured to the work spindle 212 which carries the clutch member to be cut.

The actuating member 202 of the Geneva mechanism is secured to a shaft 220 which is driven from the shaft 204 through change gears 221 and 222 at a 1 to 2 ratio in the instance shown so that shaft 220 may make one revolution per tooth space of the clutch member being cut and the shaft 204 will make two revolutions per tooth space of the clutch member being cut. The actuating member 202 carries a pin or roller 224 which is adapted to engage in a slot 225 of the Geneva wheel 203 to drive the Geneva wheel.

During cutting of the helicoidal side surfaces of the teeth, the housing 205 is stationary and the work is driven at a uniform velocity. During this part of the operation, the shaft 204 turns in the direction 226 causing the shaft 211 to turn in the opposite direction 227. Periodically, however, the pin 224 engages the slot 225 of the Geneva wheel 203 to turn the housing 205. This tends to turn shaft 211 in the direction 226 which is opposed to the direction 227. The resultant combined motion is transmitted to the work spindle 212 through the change gears 213, 214, 215, and 216, the shaft 217, the worm 218 and the worm-wheel 219. Thus, periodically an added motion at a varying velocity is imparted to the work spindle to slow the work spindle rotation up and to stop it, and reverse it, thereby to obtain the movement of the work required for cutting the tooth spaces.

Figure 23:
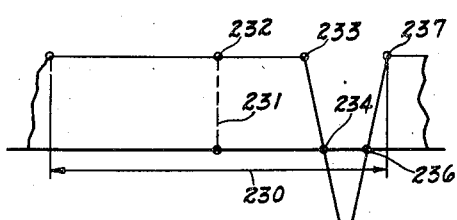
Fig. 23 is a velocity diagram, illustrating one way in which the machine may be operated according to this invention to produce a saw-tooth clutch.

A velocity diagram of the work rotation is shown in Fig. 23. The abscissa denotes the angle of rotation of the shaft 220. Distance 230 represents a tooth cycle. The ordinate 231 at any point 232 in the rotation of the shaft 220 is a measure of the speed of rotation of the work spindle 212 or of shaft 211 in comparison with the speed of rotation of the shaft 220 at that moment. The velocity of rotation of the work spindle stays constant up to point 233 when the Geneva motion becomes effective. Then the rotation slows down. It is reversed at point 234; reaches maximum speed in reverse at point 235; then slows down gradually to point 236 where forward rotation begins again. Forward speed quickly picks up until point 237 is reached where the effect of the Geneva motion ceases and uniform rotation begins again in the cutting of the side of a new tooth space. The total turning motion of the shaft 211 per tooth cycle is two turns less ½ turn which is substracted by the Geneva motion, that is, it is 1½ turns in the instance shown. The index gears 213, 214, 215 and 216 have then to be so chosen that 1½ turns of the shaft 211 are reduced to $$\frac{1}{n}$$

turns of the work spindle, where $n$ denotes the number of teeth in the clutch member to be cut.

Figs. 21 and 22 illustrate only one form of mechanism for effecting the desired motion of the work. There are other ways in which this same result may be achieved, as, for instance, by using cams to produce the varying rotation.

Figure 26:
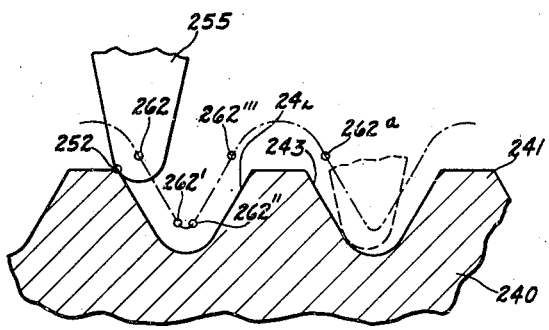
Fig. 26 is a mean circular section on an enlarged scale of this clutch member and illustrating diagrammatically the method of cutting the same.
Figure 24:
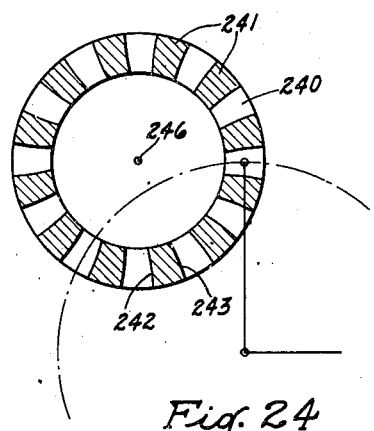
Figs. 24 and 25 are a sectional view in the pitch plane and a fragmentary elevational view, partly in axial section, respectively, of a clutch member made according to a further embodiment of this invention and having helicoidal surfaces on both sides of its teeth.
Figure 25:
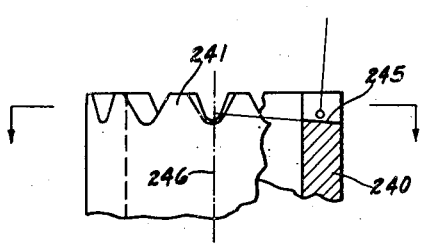

Figs. 24 to 26 inclusive illustrate a further embodiment of clutch made according to this invention. The clutch member 240 here illustrated has teeth 241 with helicoidal surfaces on both sides 242 and 243. The opposite side surfaces of the teeth are helicoids of the same lead but opposite hand. Both sides of a tooth space may be produced in the same operation by slightly inclining the cutting direction, that is, by cutting the tooth spaces to taper in depth. Thus the bottoms 245 of the tooth spaces will be inclined to the pitch plane, see Fig. 25.

Figure 27:
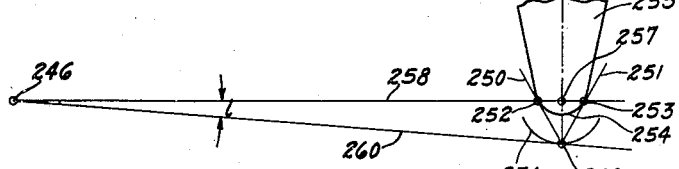
Fig. 27 is a diagrammatic view further illustrating the relationship between the cutter and work in the cutting of this clutch member.

Inclination angle $i$ of the cutting direction to pitch plane or any plane of rotation perpendicular to the clutch axis 246 can readily be determined, as indicated diagrammatically in Fig. 27. The tangents 250 and 251 at mean finishing points 252 and 253, respectively, in the tip cutting profile of a blade 255 of the face-mill cutter used to cut the clutch member are first drawn. Then a circle 256 is drawn about a point 257. The point 257 is midway between the points 252 and 253, and the circle 256 is so drawn as to pass through the intersection point 259 of the tangents 250 and 251. Line 258 is then drawn through points 252, 257 and 253. Then the mean clutch radius A is plotted on the line 258 from point 257 to point 246. The line 260 is then drawn from point 246 tangent to circle 256 at point 259. The angle $i$ is the angle included between the lines 258 and 260. In mathematical terms, with $b$=distance 257—259, $$\sin i = \frac{b}{A}$$

as before.

Fig. 26 is a mean circular section concentric with the clutch axis developed into the plane of the drawing. The blades 255 of the cutter contact with a helical tooth profile 243 of the clutch member at point 252 of the rounded cutting surface of the tool. The center of this cutting surface is at 262. During the cut, the cutter rotates on its axis while a relative feed movement is effected between cutter and work comprising uniform rotation about the work axis and uniform in-feed to full depth, reversal, and uniform out-feed while the work rotation goes on uniformly in the same direction. The center of the cutting profile then moves from position 262 to position 262′ during the uniform in-feed, thence to position 262″ during reversal and acceleration and from 262″ to 262‴, during the uniform out-feed. A tooth space is then completed. As the axial feed motion is slowed down, reversed, and brought up to full speed again, the clutch is indexed and the cycle begins anew on the next tooth space with the center of the effective cutting surface of the cutter at position 262a. The cutting tool is shown in full line position at the beginning of the cut on one tooth space and in dotted lines at nearly full depth position in the cutting of the next tooth space.

In order to achieve indexing from tooth space to tooth space, the work may go on rotating at a uniform rate, but its rotation is preferably sped up so that the distance 262‴—262a is covered at a faster rate and the non-cutting time is reduced to a minimum. A mechanism similar to that illustrated in Fig. 21 can be provided to achieve the speed-up. In this case, an idler may be used between the change gears 221 and 222 so that the shafts 220 and 204 will turn in the same direction. The Geneva motion is then applied in the same direction to the shaft 211 as is the uniform rotation of the shaft 204. For the cutting of a clutch member such as shown in Figs. 24 to 26 inclusive, the turning ratio of shafts 204 and 220 may be made 1 to 1 so that each of said shafts performs one revolution per tooth cycle.

Figure 28:
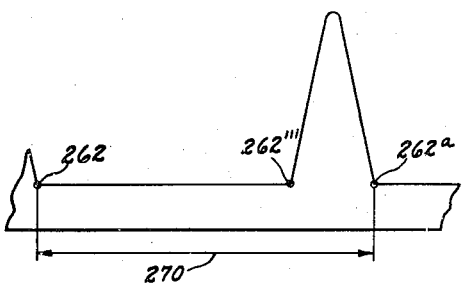
Fig. 28 is a velocity diagram similar to Fig. 23, showing how the work spindle of the cutting machine is driven during cutting of the clutch member of Figs. 24 to 26.

A velocity diagram of the operation of cutting the clutch member 240 is then illustrated diagrammatically in Fig. 28. 270 denotes the tooth cycle. The abscissa denotes the angle of rotation of the shaft 220. The ordinate is a measure of the turning speed of the work spindle. The velocity of rotation of the work is uniform from the point 262 to the point 262‴ during the cutting of a tooth space. Then it is accelerated and decelerated again between the point 262‴ and the point 263a when no cutting is going on. Then the uniform rotation begins again for the cutting of the next tooth space.

As has already been indicated, the invention is not limited to the cutting of clutch members with tools of the types previously described. Thus, in the cutting of saw-tooth clutches, tools of various profile shapes may be used. Figs. 29 and 30, show a pair of cutters having curved side-cutting edges for cutting saw-tooth clutch members made according to a further embodiment of the invention. The two cutters are designated 160 and 170, respectively. The axes of these two cutters are at 161 and 171, respectively. The cutter 160 has a curved outside cutting profile 162 which is a circular arc centered at point 163 on the cutter axis 161. The cutter 170 has a curved inside cutting profile 172 which is a circular arc centered at 173 on the cutter axis 171. 164 and 174, respectively, are the normals at the mean points 165 and 175, respectively, in the side-cutting edges of the two cutters which correspond to matching points of the contacting non-helicoidal sides of the two engaging clutch members. Mismatch on these sides of the clutch teeth is obtained when the normal radius 163—165 is made larger than the normal radius 173—175. With the described construction, the outside cutting surface having the profile 162 is part of a spherical surface and the inside cutting surface having the profile 172 is also a part of a spherical surface and so are the tooth surfaces produced by these cutters on one side of the teeth of the mating clutch members. The opposite helicoidal sides of the teeth of these clutch members are produced as before by curved tip cutting edges 166 and 176, respectively, which are circular arcs centered at 167 and 177, respectively. The points 168 are 178, respectively, in these curved tip-cutting surfaces are the points which finish cut the mean portions of the helicoidal sides of the clutch teeth.

As has also been stated, the radii of the edges for cutting the helicoidal sides of the clutch teeth may be varied too. In Fig. 31, I have shown a blade 140 which has a much larger tip-cutting edge radius than any of the blades of the cutters previously described. Here the tip-cutting edge is denoted at 141. Its center of curvature is at 142 while its curvature radius is denoted at 143. 145 in Fig. 32 designates a blade having a still larger radius of cutting edge for cutting the helicoidal sides of clutch teeth. The curved cutting edge is denoted at 146, its radius at 147, and its center at 148. In the case illustrated in Fig. 32, the curved cutting edge 146 constitutes the whole of one side and the tip profile of the blade.

Large radii of profile curvatures, such as 143 and 147, for cutting helicoidal sides of a clutch tooth are desirable in order to obtain smooth finish and also for reducing the number of cuts required. Their use is, however, limited to the cutting of clutch members having moderate tooth face length. The line of contact between the curved cutting surface and the helicoid produced thereby is inclined to the direction of cut and its inclination increases with increased profile radius. A line of contact between the cutting surface of the blade 145 and the helicoidal surface produced thereby at a mean feed position during cutting is shown at 150 in Fig. 8. This line of contact is seen to be more inclined to a plane of rotation perpendicular to the axis 39 of the clutch member than is the cutting plane 73 or a plane 73' parallel thereto. It is obvious that if the radius of the curved cutting surface, which produces the helicoidal tooth sides, were increased in such way as to exaggerate the inclination of the line 150, not enough of the helicoid would be formed at the inside ends of the clutch teeth. Hence, as stated above, the curvature radius of the cutting edges for producing the helicoidal sides of the clutch teeth is limited by the face width of the clutch member to be cut.

In general it may be said that while the invention has been described in connection with certain particular embodiments thereof, it will be understood that it is capable of still further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting a side tooth surface of a face clutch member which comprises moving a tool across the face of a work piece in a path curved longitudinally from one end to the other of a tooth of the clutch member, while effecting a relative helical movement between the tool and the work piece about and in the direction of the work axis.

2. The method of cutting a toothed face clutch member which comprises cutting each tooth space by rotating a face mill cutter in engagement with a work-piece while effecting a relative helical movement between the cutter and the work-piece about and in the direction of the axis of the work-piece until full depth position is reached, slowing down and reversing the rotation about the axis of the work-piece, while simultaneously slowing down and reversing the axial motion, and then withdrawing the cutter from engagement with the work-piece, and indexing the work-piece.

3. The method of cutting a toothed face clutch member which comprises cutting each tooth space by rotating a face-mill cutter in engagement with a work-piece while effecting a relative helical movement between the cutter and work-piece about and in the direction of the axis of the work-piece, slowing down the relative rotation about the axis of the work-piece somewhat before the cutter reaches full depth position, then after full depth position has been reached reversing both the relative rotation and the relative axial motion, and then withdrawing the cutter from engagement with the work-piece, and indexing the work-piece.

4. The method of cutting side tooth surfaces of a face clutch member which comprises rotating a face mill cutter in engagement with a work-piece, and feeding the cutter in the direction of the clutch axis until full depth position is reached to cut one side of a tooth space, then effecting a relative movement of withdrawal between the cutter and the work piece in the direction of the axis of the work piece while rotating the work piece on its axis in time with said withdrawal movement to cut the opposite side of the tooth space.

5. The method of cutting a toothed face clutch member which comprises cutting opposite sides of each tooth space in the same operation by rotating a face mill cutter in engagement with a work piece, one side of the work piece being cut as the counterpart of the side-cutting edges at one side of the cutter while the cutter is cutting in full depth position, and the opposite side of the tooth space being cut by the tip-cutting edges of the cutter by effecting a relative movement between the rotating cutter and the work piece about and in the direction of the axis of the work piece.

6. The method of cutting side tooth surfaces of a face clutch member which comprises employing a face-mill cutter that has a plurality of circularly arranged cutting blades which have rounded tip cutting edges and side cutting edges at one side, positioning said cutter so that a plane of rotation perpendicular to the axis of the cutter is inclined to the clutch axis so as to cut deeper at the outer ends of the clutch teeth and rotating the cutter in engagement with the work piece while effecting a relative helical motion between the cutter and work piece about and in the direction of the axis of the work piece.

7. The method of cutting a toothed face clutch member which comprises employing a face mill cutter that has a plurality of circularly arranged cutting blades which have rounded tip-cutting edges and side-cutting edges at one side, positioning said cutter so that a plane of rotation perpendicular to the axis of the cutter is inclined to the clutch axis so as to cut deeper at the outer ends of the clutch teeth, and cutting one side of each tooth space of the work by rotating the cutter in engagement with the work-piece while rotating the work-piece on its axis and simultaneously effecting a relative motion between the cutter and the work-piece in the direction of the axis of the work-piece and in time with the rotation of the work-piece, and cutting the opposite side of each tooth space as the counterpart of the cutting surface by continuing to rotate the cutter in engagement with the work-piece at full depth position.

8. The method of cutting a pair of engaging toothed face clutch members which comprises cutting one side of each tooth space of each member by rotating a face-mill cutter, that has rounded top-cutting edges and side-cutting edges at one side, in engagement with a work-piece while effecting a relative helical motion between the cutter and work-piece in the direction of the axis of the work-piece, and cutting the opposite side of each tooth space as the counterpart of the cutting surface described by the rotating cutting edges when the cutter is at full depth position, the cutter for cutting one member of the pair having outside finish cutting edges, and the cutter for cutting the other member of the pair having inside finish cutting edges, and the normal radii of the outside finish cutting edges of one cutter being larger than the normal radii of the inside finish cutting edges of the other cutter.

9. The method of cutting a pair of engaging toothed face clutch members which comprises cutting each member of the pair with a face-mill cutter by tilting said cutter so that its axis is inclined to the axis of the work-piece, and rotating the cutter in engagement with the work-piece while rotating the work-piece on its axis and simultaneously effecting a relative feed movement in the direction of the axis of the work-piece in time with the rotation of the work-piece, the cutter used for cutting one member of the pair having all inside blades, and the cutter used for cutting the other member of the pair having all outside blades, the axis of the cutter used for cutting one member of the pair being offset from the axis of the work-piece on the side opposite the zone of cut, while the axis of the cutter used for cutting the other member of the pair is offset from the axis of the work-piece on the same side as the zone of cut.

10. The method of cutting the side tooth surfaces of a toothed face clutch member which comprises rotating a face-mill cutter in engagement with a work-piece while rotating the work-piece on its axis at a uniform velocity and simultaneously imparting a relative feed movement between the cutter and the work-piece at a uniform rate in the direction of the axis of the work-piece and in time with the rotation of the work-piece.

11. The method of cutting a toothed face clutch member which comprises employing a face mill cutter having rounded tip cutting edges and rotating said cutter in engagement with a work-piece while rotating the work-piece continuously on its axis and effecting a relative feed movement between the cutter and work-piece axially of the work-piece, first in one direction and then in the other to cut first one side of a tooth space of the clutch member and then the other.

12. The method of cutting side tooth surfaces of a face clutch member which comprises moving a cutting tool, which has a rounded tip cutting edge and a side-cutting edge at one side, across the face of the work so that the tool cuts tooth surfaces decreasing in depth from their outer to their inner ends, and simultaneously effecting a relative helical motion between the tool and work about the axis of the work.

13. The method of cutting side tooth surfaces of a face clutch member which comprises moving a cutting tool, which has a rounded tip cutting edge and a side cutting edge at one side, across the face of the work so that the tool cuts tooth surfaces decreasing in depth from their outer to their inner ends, and effecting a relative depthwise feed motion in one direction between the tool and the work to cut one side of a tooth space and a relative depthwise feed motion in the opposite direction and in time therewith a relative rotary motion between the tool and work about the work axis to cut the opposite side of the tooth space, and indexing the work after a tooth space has been completed and the tool is clear of the work, and repeating the described cycle of operations until the clutch member is completed.

14. The method of cutting side tooth surfaces of a face clutch member which comprises positioning a face mill cutter, that has side cutting edges inclined to its axis and rounded tip cutting edges, so that the side cutting edges are parallel to the axis of the work and a plane perpendicular to the cutter axis is inclined to a plane perpendicular to the work axis, and rotating the cutter in engagement with the work while rotating the work on its axis and effecting in time therewith a relative depthwise feed motion between the cutter and the work.

15. The method of cutting side tooth surfaces of a face clutch member which comprises positioning a face mill cutter, which has side cutting edges inclined to its axis and rounded tip cutting edges, so that the side-cutting edges are parallel to the axis of the work and a plane perpendicular to the cutter axis is inclined to a plane perpendicular to the work axis, and rotating the cutter in engagement with the work, and effecting a relative depthwise feed motion in one direction between the cutter and work to cut one side of a tooth space and a relative depthwise feed motion in the opposite direction and in time therewith a relative rotary motion between the tool and work about the work axis to cut the opposite side of the tooth space, and indexing the work after a tooth space has been completed and the tool is clear of the work, and repeating the described cycle of operations until the clutch is completed.

16. The method of cutting the sides of the teeth of a face clutch member which comprises moving a cutting tool, that has rounded tip cutting edges and straight side-cutting edges of positive pressure angle at one side, in a curved path across the face of the work while effecting a relative movement between the tool and the work about and in the direction of the work axis.

17. The method of cutting side tooth surfaces of a face clutch member which comprises employing a face-mill cutter, positioning said cutter so that a plane of rotation perpendicular to the axis of the cutter is inclined to the axis of the work so that the cutter will cut deeper at the outer ends of the clutch teeth than at the inner ends thereof, and rotating the cutter in engagement with the work while effecting a relative helical motion between the cutter and work about and in the direction of the axis of the work.

ERNEST WILDHABER.

REFERENCES CITED

The following references are of record in the file of this patent:

UNITED STATES PATENTS

| Number | Name | Date |
|---|---|---|
| 1,039,915 | Faber | Oct. 1, 1912 |
| 1,380,286 | Anderson et al. | May 31, 1921 |
| 1,498,231 | Carter | June 17, 1924 |
| 1,622,014 | Wildhaber | Mar. 22, 1927 |
| 2,334,366 | Wildhaber | Nov. 16, 1943 |